Dec. 10, 1957     F. J. STOFFEL     2,815,991

NYLON DISC BEARINGS FOR GRAIN DRILLS

Filed May 25, 1956

Frank J. Stoffel
INVENTOR.

BY *[signature]*
*Attorneys*

United States Patent Office 2,815,991
Patented Dec. 10, 1957

2,815,991

NYLON DISC BEARINGS FOR GRAIN DRILLS

Frank J. Stoffel, Fort Wayne, Ind.

Application May 25, 1956, Serial No. 587,257

6 Claims. (Cl. 308—19)

This invention relates in general to new and useful improvements in grain drills, and more specifically to an improved bearing assembly for grain drill disks.

The primary object of this invention is to provide an improved bearing assembly for grain drill disks, the bearing assembly being formed of bearing elements which are made of suitable material, such as nylon, which do not require lubrication thus eliminating both the time required for lubrication and break down due to the wearing out of bearings because of failure to lubricate.

Another object of this invention is to provide an improved grain drill disk bearing which utilizes nylon bearings of the solid type, the bearings being of such a construction whereby the weight of the grain drill disk is reduced thereby giving it longer wear and life.

Still another object of this invention is to provide an improved bearing for grain drill disks, the bearing being preferably formed of nylon whereby the existence of foreign substances does not particularly impede the bearing properties thereof, the bearing being provided with a suitable reservoir for receiving foreign substances and preventing their clogging of the bearing surfaces.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
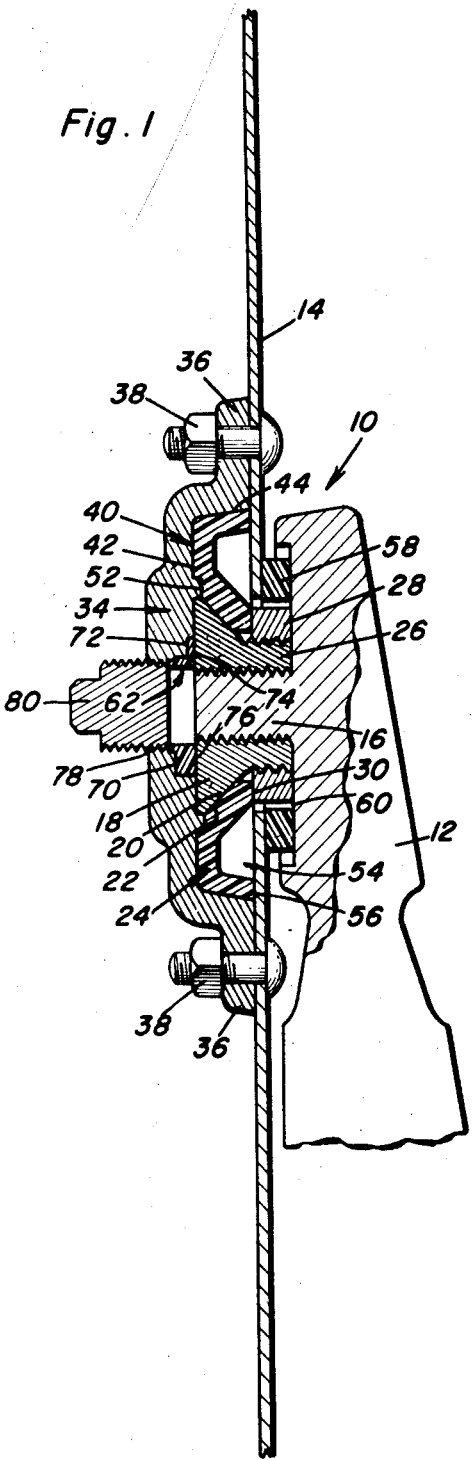
Figure 1 is a sectional view taken through the hub portion of a grain drill disk and shows the specific details of the bearing assembly thereof.

Referring now to the drawings in detail, it will be seen that there is illustrated a grain drill disk mounting assembly which is referred to in general by the reference numeral 10. The mounting assembly 10 includes a frame member 12 which forms a support for a grain drill disk 14. Extending outwardly from the frame 12 is an axle portion 16 on which there is mounted a bearing support or retainer 18 having a generally conical bearing engaging surface 20. Mounted on the bearing support 18 is a main bearing 24 having a conical surface 22 which engages the surface 20 of the bearing support 18 so as to permit the bearing support 18 to position the main bearing 24.

In order to facilitate the positioning of the main bearing 24 on the bearing support 18, the bearing support 18 also includes an inner sleeve portion 26 which is externally threaded and which has threadedly engaged thereon a retaining ring 28. The retaining ring 28 clampingly engages an inner annular part 30 of the main bearing 24.

Figure 3:
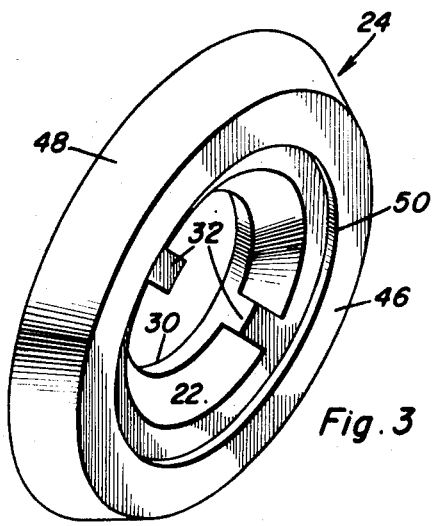
Figure 3 is an enlarged rotated perspective view of a main bearing.
Figure 4:
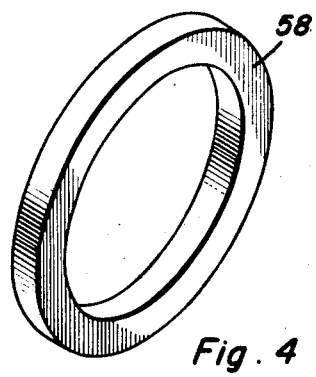
Figure 4 is a perspective view of an inner thrust bearing.

Referring now to Figure 3 in particular, it will be seen that the main bearing 24 has projecting outwardly from the conical surface 22 thereof a pair of lugs 32. The lugs 32 are suitably seated in recesses (not shown) formed in the bearing support 18 to lock the main bearing 24 to the bearing support 18 and prevent rotation thereof.

Secured to the outer face of the grain drill disk 14 is a cup shaped mounting plate which is referred to in general by the reference numeral 34. The mounting plate 34 includes an offset peripheral flange 36 which is disposed in abutting relation with the outer face of the main drill disk 14 and which is releasably secured thereto by means of circumferentially spaced fasteners 38. Formed in the inner surface of the cup shaped mounting plate 34 is a recess which is referred to in general by the reference numeral 40. The recess 40 includes an outer bearing surface 42 and a tapered peripheral bearing surface 44.

The peripheral part of the main bearing 24 is seated in the recess 40 and disposed between the mounting plate 34 and the grain drill disk 14. The main bearing 24 includes an outer annular bearing surface 46 which is disposed in face to face engagement with the bearing surface 42. The main bearing 24 also includes a peripheral tapered bearing surface 48 which is engaged in face to face engagement with the bearing surface 44. The bearing surface 46 is recessed at 50 and receives an annular projection 52 of the mounting plate 34. The annular projection 52 serves to position the main bearing 24, the bearing support 18 and the mounting plate 34 with respect to each other, as is best illustrated in Figure 1.

As is best illustrated in Figure 1, the main bearing 24 is provided with a recess 54 in the inner surface thereof. The recess 54 serves as a reservoir for trash and other foreign matter which may enter into the interior of the bearing assembly. The recess 54 separates the inner surface of the main bearing 24 into two parts including the part 30 and a peripheral part 56. The peripheral part 56 is in the form of an annular bearing surface which engages the outer surface of the grain drill disk 14 and further facilitates the positioning and rotation of the grain drill disk 14 about the main bearing 24.

In order to take any side thrust imposed upon the grain drill disk 14, there is positioned between the frame member 12 and the inner surface of the grain drill disk 14 an annular inner thrust bearing 58. The thrust bearing 58 has an outer surface engaging the inner face of the grain drill 14 and an inner surface engaging a bearing surface 60 formed on the frame member 12, the bearing surface 60 being slightly recessed, as is best illustrated in Figure 1.

Figure 2:
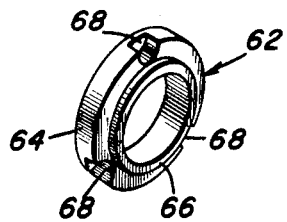
Figure 2 is an enlarged rotated perspective view of an outer thrust bearing.

Referring now to Figure 2, it will be seen that there is illustrated an outer thrust bearing which is referred to in general by the reference numeral 62. The outer thrust bearing 62 includes an annular main portion 64 and an outwardly projecting positioning flange 66. The bearing 62 also includes positioning notches 68 formed in the outer face of the main portion 64.

The inner face of the bearing plate 34 is provided with a second recess 70 which is an extension of the recess 40 and which is aligned with the bearing support 18. Seated in the recess 70 is the outer thrust bearing 62. Projecting into the recess 70 at circumferentially spaced intervals are lugs 72 which are received in the recesses 68 to lock the other thrust bearing 62 to the mounting plate 34. The outer thrust bearing 62 includes an inner bearing surface 74 which engages the outer end of the bearing support 18, the outer end of the bearing support 18 including a bearing surface 76.

The mounting plate 34 includes an outer externally threaded bore 78. Threadedly engaged in the bore 78 is a plug 80 which is engageable with the flange 66. By adjusting the plug 80, the pressure on the thrust bearings 58 and 62 may be varied.

It is to be understood that the bearings 24, 58 and 62 are to be formed of a suitable plastic material, such as nylon. These materials require no lubricants, such as oil and the like, but when provided with suitable bearing surfaces, such as those described above, will function as long wearing bearings. The bearings 24, 58 and 62, if made of nylon or similar materials, are not susceptible to wear because of the existence of foreign matters as in the case of normal bearings. Further, no grease fittings are required and shut down time for lubrication is eliminated. A further desirable feature of the bearings 24, 58 and 62 is that the entire mounting assembly for the grain drill disk 14 may be made lighter. It is to be understood that the bearing assembly described above is readily adaptable to both new and old constructions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A mounting assembly for a grain drill disk comprising a grain drill disk, a cup shaped mounting plate secured to said grain drill disk in opposed relation, a frame member, an axle forming member extending from said frame member, a bearing support fixedly carried by said axle forming member, a main bearing fixedly carried by said bearing support, said mounting plate having inner bearing surfaces, said main bearing having a peripheral portion thereof disposed within said mounting plate and engaging said bearing surfaces, said main bearing having an inner part thereof in the form of a bearing surface engaging said grain drill disk, said frame member having a bearing face opposing said grain drill disk, an inner thrust bearing disposed between said grain drill disk and said bearing face.

2. A mounting assembly for a grain drill disk comprising a grain drill disk, a cup shaped mounting plate secured to said grain drill disk in opposed relation, a frame member, an axle forming member extending from said frame member, a bearing support fixedly carried by said axle forming member, a main bearing fixedly carried by said bearing support, said mounting plate having inner bearing surfaces, said main bearing having a peripheral portion thereof disposed within said mounting plate and engaging said bearing surfaces, said main bearing having an inner part thereof in the form of a bearing surface engaging said grain drill disk, said frame member having a bearing face opposing said grain drill disk, an inner thrust bearing disposed between said grain drill disk and said bearing face, said main bearing and said inner thrust bearing being formed of nylon.

3. A mounting assembly for a grain drill disk comprising a grain drill disk, a cup shaped mounting plate secured to said grain drill disk in opposed relation, a frame member, an axle forming member extending from said frame member, a bearing support fixedly carried by said axle forming member, a main bearing fixedly carried by said bearing support, said mounting plate having inner bearing surfaces, said main bearing having a peripheral portion thereof disposed within said mounting plate and engaging said bearing surfaces, said main bearing having an inner part thereof in the form of a bearing surface engaging said grain drill disk, an outer thrust bearing disposed between said mounting plate and said bearing support, said bearing support having an end bearing surface engaging said outer thrust bearing.

4. A mounting assembly for a grain drill disk comprising a grain drill disk, a cup shaped mounting plate secured to said grain drill disk in opposed relation, a frame member, an axle forming member extending from said frame member, a bearing support fixedly carried by said axle forming member, a main bearing fixedly carried by said bearing support, said mounting plate having inner bearing surfaces, said main bearing having a peripheral portion thereof disposed within said mounting plate and engaging said bearing surfaces, said main bearing having an inner part thereof in the form of a bearing surface engaging said grain drill disk, an outer thrust bearing disposed between said mounting plate and said bearing support, said bearing support having an end bearing surface engaging said outer thrust bearing, said main bearing and said outer thrust bearing being formed of nylon.

5. A mounting assembly for a grain drill disk comprising a grain drill disk, a cup shaped mounting plate secured to said grain drill disk in opposed relation, a frame member, an axle forming member extending from said frame member, a bearing support fixedly carried by said axle forming member, a main bearing fixedly carried by said bearing support, said mounting plate having inner bearing surfaces, said main bearing having a peripheral portion thereof disposed within said mounting plate and engaging said bearing surfaces, said main bearing having an inner part thereof in the form of a bearing surface engaging said grain drill disk, said frame member having a bearing face opposing said grain drill disk, an inner thrust bearing disposed between said grain drill disk and said bearing face, an outer thrust bearing disposed between said mounting plate and said bearing support, said bearing support having an end bearing surface engaging said outer thrust bearing.

6. A mounting assembly for a grain drill disk comprising a grain drill disk, a cup shaped mounting plate secured to said grain drill disk in opposed relation, a frame member, an axle forming member extending from said frame member, a bearing support fixedly carried by said axle forming member, a main bearing fixedly carried by said bearing support, said mounting plate having inner bearing surfaces, said main bearing having a peripheral portion thereof disposed within said mounting plate and engaging said bearing surfaces, said main bearing having an inner part thereof in the form of a bearing surface engaging said grain drill disk, said main bearing being formed of nylon, said main bearing having a recess in the inner surface thereof facing said grain drill disk for receiving foreign matter.

References Cited in the file of this patent

UNITED STATES PATENTS

| | | |
|---|---|---|
| 1,860,305 | Baseman | May 24, 1932 |
| 2,410,927 | Callahan et al. | Nov. 12, 1946 |
| 2,724,867 | Smith | Nov. 29, 1955 |